(12) United States Patent
Nakaminato et al.

(10) Patent No.: US 8,351,805 B2
(45) Date of Patent: Jan. 8, 2013

(54) POWER SAVING PROCESSING APPARATUS, IMAGE FORMING APPARATUS, AND COMPUTER READABLE MEDIUM THAT ARE ADAPTABLE TO ABNORMALITIES

(75) Inventors: Tsutomu Nakaminato, Kanagawa (JP); Tsuyoshi Horikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 318 days.

(21) Appl. No.: 12/711,728

(22) Filed: Feb. 24, 2010

(65) Prior Publication Data

US 2011/0076038 A1   Mar. 31, 2011

(30) Foreign Application Priority Data

Sep. 29, 2009  (JP) ................................. 2009-224565

(51) Int. Cl.
*G03G 15/00* (2006.01)
(52) U.S. Cl. ......................................................... 399/37
(58) Field of Classification Search ................... 399/37, 399/75, 88
See application file for complete search history.

(56) References Cited

FOREIGN PATENT DOCUMENTS

| JP | 11053207 A | 2/1999 |
|---|---|---|
| JP | 2008182580 A | 8/2008 |

OTHER PUBLICATIONS

Computer translation of JP2008-182580A; Aug. 2008; to Nagase.*

* cited by examiner

*Primary Examiner* — Quana M Grainger
(74) *Attorney, Agent, or Firm* — Sughrue Mion, PLLC

(57) ABSTRACT

A power saving processing apparatus that includes a processing unit, an output unit and a transition unit is provided. The processing unit is configured to transition from a first state where power is supplied to a second state where power supply is restricted, executes a first process required for such transition before transition from the first state to the second state, and executes a second process to output a first signal after executing the first process. The output unit outputs a second signal after receiving the first signal output from the processing unit, and outputs the second signal when not receiving the first signal output from the processing unit within a predetermined time period after a predetermined time after the first process starts. The transition unit transitions the processing unit to the second state after receiving the second signal output from the output unit.

10 Claims, 9 Drawing Sheets

POWER SAVING PROCESSING APPARATUS, IMAGE FORMING APPARATUS, AND COMPUTER READABLE MEDIUM THAT ARE ADAPTABLE TO ABNORMALITIES

CROSS-REFERENCE TO RELATED APPLICATIONS

This application is based on and claims priority under 35 USC 119 from Japanese Patent Application No. 2009-224565 filed Sep. 29, 2009.

BACKGROUND

1. Technical Field

The invention relates to a power saving processing apparatus, an image forming apparatus, and a computer readable medium that stores a power saving processing program.

2. Related Art

A vehicle control apparatus having two CPUs that transmits a setting value for recovering a normal operation from one CPU to the other CPU and an energy saving control apparatus that restarts a system after a predetermined time has been elapsed have been known.

SUMMARY

According to an aspect of the invention, there is provided a power saving processing apparatus that includes: a processing unit that is configured to transition from a first state where power is supplied and an operation is enabled to a second state where power supply is restricted and the operation is disabled, that executes a first process required for such transition before transition from the first state to the second state, and that executes a second process to output a first signal after executing the first process; an output unit that outputs a second signal after receiving the first signal output from the processing unit, and that outputs the second signal when not receiving the first signal output from the processing unit within a predetermined time period after a predetermined time after the first process starts; and a transition unit that transitions the processing unit to the second state after receiving the second signal output from the output unit.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the accompanying drawings.

First Exemplary Embodiment

Figure 1:
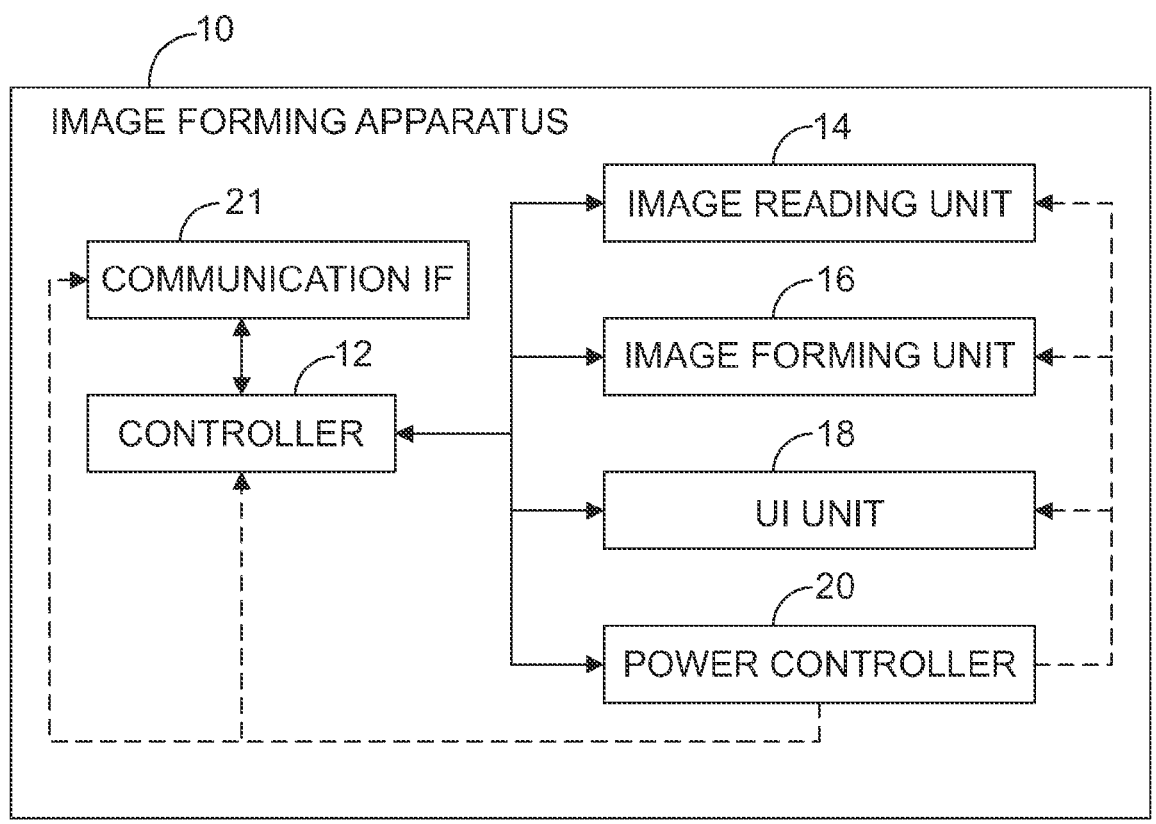
FIG. 1 is a diagram illustrating the configuration of an image forming apparatus according to first to fifth exemplary embodiments of the invention.

FIG. 1 illustrates the configuration of an image forming apparatus 10 according to the first exemplary embodiment.

As illustrated in FIG. 1, the image forming apparatus 10 includes a controller 12, an image reading unit 14, an image forming unit 16, a user interface (UI) unit 18, a power controller 20, and a communication interface (IF) 21.

The image reading unit 14 is composed of a scanner, and reads an original image and acquires image information representing the original image.

The image forming unit 16 forms an image based on the image information. The image forming unit 16 according to the first exemplary embodiment is an image forming unit of an electrophotographic system that electrifies a photoreceptor, exposes the photoreceptor based on the image information, develops an electrostatic latent image generated by the exposure using a toner, directly transfers the developed image to a recording medium or transfers the developed image to the recording medium through an intermediate transfer body, and fixes the transferred image using a fixer. The image forming unit 16 is not limited thereto, and may be an image forming unit of an inkjet system.

The UI unit 18 includes a touch panel display where a touch panel is overlaid to a display and operation buttons, and displays a variety of information, sets a variety of information and/or designates a command according to operations from a user. The operation buttons include a release button that is used to release first to third power saving states to be described in detail below.

The power controller 20 supplies power to each of the controller 12, the image reading unit 14, the image forming unit 16, the UI unit 18, and the communication IF 21 from a power supply, and restricts the supply of power to the image reading unit 14, the image forming unit 16, and the UI unit 18, according to a control signal from the controller 12. In FIG. 1, a broken line indicates a power supply line.

The communication IF 21 is an interface that is used to communicate with an external apparatus connected to a communication unit, such as the Internet, a local area network (LAN) or a public circuit.

The controller 12 controls the operation of the image forming apparatus 10. For example, the controller 12 receives the image information from a host computer that is connected through the communication IF 21, and controls the image forming unit 16, such that an image is formed based on the received image information. The controller 12 controls the image reading unit 14, reads the original image, and controls the image forming unit 16, such that an image is formed based on the image information obtained by the reading. As described above, the controller 12 controls the power controller 20 to also control the power supply.

The image forming apparatus 10 according to the first exemplary embodiment is configured to transit to plural power saving states where power consumption is different, as described in detail below.

A first power saving state: power that is supplied to the fixer of the image forming unit 16 is restricted to become smaller than predetermined ordinary power (the power supply is stopped in the first exemplary embodiment), and power that enables the operation is continuously supplied to the other components.

A second power saving state: the power that enables the operation is supplied to the controller 12 and the communication IF 21, and the power that is supplied to the image reading unit 14, the image forming unit 16, and the UI unit 18 is restricted to become smaller than the predetermined ordinary power (the power supply is stopped in the first exemplary embodiment).

A third power saving state: the power that is supplied to a central processing unit (CPU) 30 (to be described in detail below) in the controller 12 as well as the image reading unit 14, the image forming unit 16, and the UI unit 18 is restricted to become smaller than the predetermined ordinary power enabling the CPU 30 to be operated (the power supply is stopped in the first exemplary embodiment). However, the power is continuously supplied to the components such as ASIC (Application Specific Integrated Circuit) to be described in detail below 34 or a timer IC (Integrated Circuit) 38, which performs a control operation, such that the supply of power to the CPU 30 restarts when predetermined events such that a release button to release a power saving state is pressed, an access is given to receive print information from an external apparatus through the communication IF 21, are generated outside of the controller 12, even during a period where the supply of power to the CPU 30 is stopped and the operation of the CPU 30 is disabled. Hereinafter, the predetermined even that is generated outside of the controller 12 is called an external event.

The states other than the first to third power saving states are called non-power saving states.

The magnitude of the consumed power increases in the order of the non-power saving state>the first power saving state>the second power saving state>the third power saving state.

Figure 2:
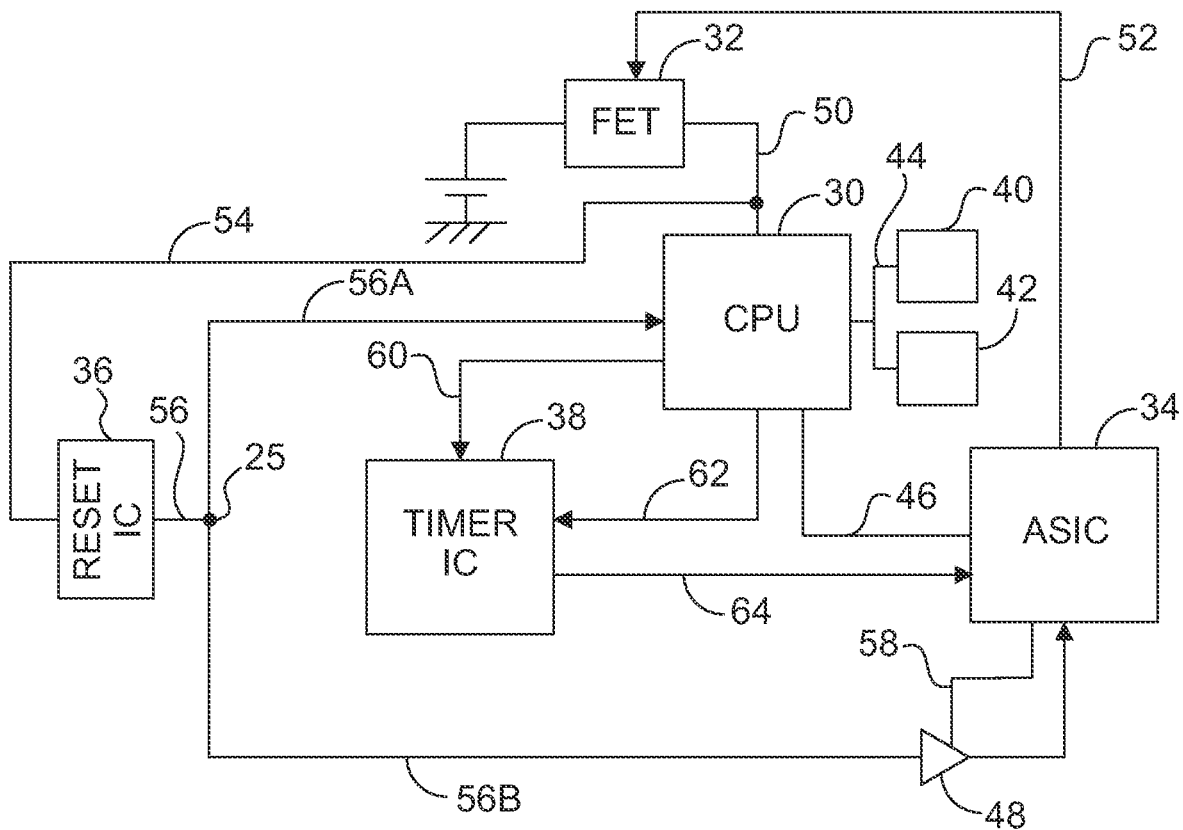
FIG. 2 is a diagram illustrating the configuration of a controller according to the first exemplary embodiment.

FIG. 2 illustrates the configuration of the controller 12. The controller 12 includes a CPU 30, a field effect transistor (FET) 32, an ASIC 34, a reset integrated circuit (IC) 36, and a timer IC 38.

The CPU 30 is connected to a read only memory (ROM) 40 and a random access memory (RAM) 42 through a system bus 44. The ROM 40 stores programs executed by the CPU 30 or parameters used by the CPU 30. The RAM 42 is composed of, for example, a DRAM, and is used as a work memory by the CPU 30 and to store a variety of data, if necessary.

The programs that are stored in the ROM 40 also include a program that is used to control a transition to the power saving states. In the first exemplary embodiment, when the CPU 30 of the controller 12 executes the program, the power controller 20 is controlled to transit to the first power saving state, when a waiting state where an operation with respect to the UI unit 18, an image forming operation, and an image reading operation are not performed is continued for a predetermined time t1. When the waiting state is continued for a predetermined time t2 after the first power saving state starts, the CPU 30 controls the power controller 20 to transit to the second power saving state. When the waiting state is continued for a predetermined time t3 after the CPU 30 transitions to the second power saving state, the CPU 30 controls the ASIC 34 and the like to transit to the third power saving state.

The CPU 30 is connected to the FET 32 through a power line 50. When the FET 32 is turned on, power is supplied to the CPU 30 through the power line 50, and when the FET 32 is turned off, the supply of power to the CPU 30 is stopped. The FET 32 and the ASIC 34 are connected through a control line 52, and the ASIC 34 outputs a control signal to the FET 32 through the control line 52, thereby controlling ON/OFF of the FET 32.

That is, the CPU 30 transitions to a first state where the power is supplied and the operation is enabled and a second state where the power supply is restricted (that is, the supply power is smaller that that in the first state) and the operation is disabled, by the ASIC 34 and the FET 32. When CPU 30 transitions to the second state, the image forming apparatus 10 transitions to the third power saving state.

In the first exemplary embodiment, the case where the supply of power to the CPU 30 is stopped and the CPU 30 is made to transit to the second state is exemplified. However, the invention is not limited thereto, and the supply power may be smaller than that in the first state and the operation may be disabled.

Although not illustrated in the drawings, even when the CPU 30 is in the second state, the power is continuously supplied to the RAM 42. When the RAM 42 is the DRAM, the mode is switched into a self-refresh mode before the CPU 30 transitions to the second state.

The CPU 30 is connected to the ASIC 34 through a bus (PCI bus in this exemplary embodiment) 46 and communicates with the ASIC 34 through the PCI bus 46. If the ASIC 34 is isolated (electrically isolated) from the PCI bus 46, the CPU 30 and the ASIC 34 may not communicate with each other.

The power line 50 that supplies the power to the CPU 30 is connected to one end of a power monitor line 54, and the other end of the power monitor line 54 is connected to the reset IC 36. A reset signal line 56 is connected to the reset IC 36. The reset signal line 56 is branched into a reset signal line 56A and a reset signal line 56B at a branch point 25. An end of the reset signal line 56A is connected to the CPU 30 and an end of the reset signal line 56B is connected to the ASIC 34.

The reset IC 36 monitors the power monitor line 54 and detects whether the power is supplied to the CPU 30. When the reset IC 36 detects that the supply of power to the CPU 30 is stopped, the reset IC 36 outputs a reset signal to the reset signal line 56. The output reset signal is transmitted to the CPU 30 through the reset signal line 56A and transmitted to the ASIC 34 through the reset signal line 56B. When the CPU 30 and the ASIC 34 receive the reset signal, the CPU 30 and the ASIC 34 are reset (restarted).

In the reset signal line 56B, a buffer 48 is provided. A gate of the buffer 48 and the ASIC 34 are connected through a mask line 58. The ASIC 34 outputs a mask signal to the buffer 48 through the mask line 58, according to a control signal from the CPU 30. If the mask signal is input to the buffer 48, the reset signal is not output to the ASIC 34, even though the reset signal is output to the reset signal line 56B.

The CPU 30 is connected to the timer IC 38 through a timer start signal line 60 and a power saving transition notification signal line 62. The CPU 30 outputs, to the timer IC 38, a timer start signal through the timer start signal line 60 and outputs a power saving transition notification signal (for example, in the case of negative logic (active low), pulse signal having a predetermined pulse width α of an L level) through the power saving transition notification signal line 62. Hereinafter, the power saving transition notification signal that is output from the CPU 30 is called a first signal.

Figure 3:
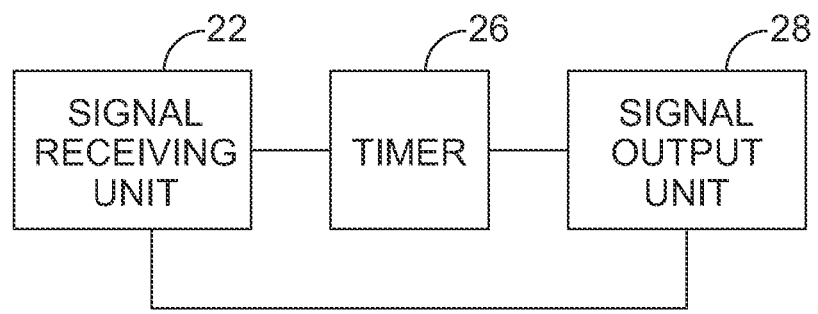
FIG. 3 is a diagram illustrating the functional configuration of a timer IC according to the first to third exemplary embodiments.

FIG. 3 illustrates the functional configuration of the timer IC 38. The timer IC 38 includes a signal receiving unit 22, a timer 26, and a signal output unit 28.

The signal receiving unit 22 detects and receives the timer start signal output from the CPU 30 through the timer start signal line 60 or the first signal output from the CPU 30 through the power saving transition notification signal line 62.

The timer 26 starts a count operation after a predetermined period of time elapsed from starting processes needed to transit the CPU 30 from the first state to the second state. In the first exemplary embodiment, when the timer start signal is received (detected) by the signal receiving unit 22, the timer 26 sets the predetermined time T1 and starts the count operation. Hereinafter, the processes (processes from (1) to (4) to be described in detail below, in the first exemplary embodiment) that are needed to transit the CPU 30 from the first state to the second state are called preprocessing.

When the predetermined time T1 elapses and the timer 26 times out, the signal output unit 28 generates a second signal to transit the CPU 30 to the second state, and outputs the second signal to the ASIC 34 through the power saving transition notification signal line 64. In the first exemplary embodiment, it is assumed that a signal having the same waveform as that of the first signal (power saving transition notification signal) is generated as the second signal.

If the ASIC 34 receives the second signal from the timer IC 38, the ASIC 34 turns off the FET 32 and stops the supply of power to the CPU 30. Thereby, the CPU 30 transitions from the first state to the second state, and the image forming apparatus 10 transitions from the second power saving state to the third power saving state.

When the signal receiving unit 22 receives the first signal output from the CPU 30 even before the timer 26 times out, the signal output unit 28 generates the second signal and outputs the second signal to the ASIC 34 through the power saving transition notification signal line 64. In the first exemplary embodiment, when the first signal is received from the CPU 30 and the second signal is output, the count operation of the timer 26 is to be stopped. Even in the configuration where the count operation of the timer 26 is not stopped and the second signal is output again by the timeout at the timer 26, the ASIC 34 does not turn on the FET 32 so as not to affect the state of the CPU 30.

The ASIC 34 has an interrupt function of notifying the CPU 30 of an occurrence of an external event, when the external event is occurred. When the external event is occurred and the CPU 30 is in the second state, the ASIC 34 restarts the power supply in order to transit the CPU 30 to the first state, and then notifies the occurrence of the external event.

A control flow of when the CPU 30 according to the first exemplary embodiment transitions from the first state to the second state will be described. The preprocessings described in (1) to (4) to be described below that is needed to transit the CPU 30 to the second state are sequentially executed.

(1) The CPU 30 saves (stores), in the RAM 42, data needed to recover the CPU 30 to the state before the CPU 30 transitions to the second state, when the power supply restarts and the CPU 30 transitions to the first state, even though the supply of power to the CPU 30 is stopped and the CPU 30 transitions to the second state. For example, the stored data includes data indicating the current state of the image forming apparatus 10, such as data indicating the kind of the currently connected UI unit 18 when the UI unit 18 is an element detachable from the image forming apparatus 10 and data indicating whether print information is currently accumulated by the image forming apparatus 10. Hereinafter, the above data is called state data.

When the image forming apparatus 10 is turned on or reset (restarts), the CPU 30 executes an initialization process, and performs work for acquiring the state data and setting the state. Meanwhile, when the CPU 30 is in the second state and the external event is occurred, the CPU 30 is not reset and transitions from the second state to the first state. However, as described above, since the CPU 30 saves the state data before transition to the second state, the work for acquiring the state data after the initialization is omitted.

(2) The CPU 30 outputs a control signal to the ASIC 34 through the PCI bus 46, changes setting of the ASIC 34, and changes a way of the interrupt work when the external event is occurred.

The ASIC 34 needs to perform the interrupt work according to the state of the CPU 30. Specifically, when the CPU 30 is in the first state and the external event is occurred, the ASIC 34 notifies the occurrence of the external event through the PCI bus 46 (first interrupt work). However, when the CPU 30 is in the second state and the external event is occurred, the ASIC 34 restarts the supply of power to the CPU 30 and transitions the CPU 30 to the first state. The ASIC 34 releases the isolation from the PCI bus 46 and notifies the occurrence of the external event through the PCI bus 46 (second interrupt work).

Accordingly, the CPU 30 rewrites a value of a register defining the interrupt work provided in the ASIC 34 before transition from the first state to the second state, and changes the setting such that the second interrupt work is to be performed.

(3) The CPU 30 outputs a control signal to the ASIC 34 through the PCI bus 46, and changes the setting of the ASIC 34 such that the mask signal is output from the ASIC 34.

As described above, in the first exemplary embodiment, if the supply of power to the CPU 30 is stopped, the reset signal is output from the reset IC 36, and the ASIC 34 is reset (restarted). If the ASIC 34 is reset, the ASIC 34 returns to the initial state. Accordingly, the CPU 30 rewrites the value of the register that is provided in the ASIC 34 and defines the mask signal output, and changes setting such that the mask signal is output from the ASIC 34 to the buffer 48. Thereby, the ASIC 34 starts the output of the mask signal to the buffer 48.

(4) The CPU 30 outputs the control signal to the ASIC 34 through the PCI bus 46, and changes the setting of the ASIC 34, such that the ASIC 34 is isolated from the PCI bus 46.

It is to prevent the power supplied to the ASIC 34 from being transmitted to the CPU 30 through the PCI bus 46, because the supply of power to the ASIC 34 is continued, even though the supply of power to the CPU 30 is stopped. If the ASIC 34 receives the control signal, a state of the interface of the ASIC 34 to the PCI bus 46 is set to a high impedance state. Thereby, the ASIC 34 is isolated from the PCI bus 46.

When the preprocessings from (1) to (4) end, the CPU 30 executes a process illustrated in the following (5).

(5) The CPU 30 writes data indicating a state (sleep state) where a problem is not generated even when the power supply is stopped to a register (hereinafter, referred to as a sleep register) previously provided in the CPU 30 and sets its state to the sleep state. When the state of the CPU 30 is set to the sleep state, the first signal is output from the CPU 30.

In addition, the CPU 30 outputs a timer start signal to the timer IC 38 at a predetermined period of time after the preprocessing starts. In the first exemplary embodiment, the timer start signal is output to the timer IC 38 before the state of the CPU 30 is set to the sleep state in process after process (4) ends. When the signal receiving unit 22 of the timer IC 38 receives the timer start signal from the CPU 30, the count operation of the timer 26 starts, as described above.

When the signal receiving unit 22 of the timer IC 38 receives the first signal output from the CPU 30 (in process (5)), as described above, the signal output unit 28 generates the second signal and outputs the second signal to the ASIC 34. When the ASIC 34 receives the second signal, the ASIC 34 turns off the FET 32 and stops the supply of power to the CPU 30. Thereby, the CPU 30 transitions from the first state to the second state.

Meanwhile, in the above process (5), after the state of the CPU 30 is set to the sleep state, when an event (hereinafter, referred to as an internal event) is occurred in the CPU 30 to recover the state of the CPU 30 from the sleep state, the events such as the state change of the CPU 30, an internal interrupt by the count operation of the internal timer of the CPU 30, an occurrence of an internal error in the CPU 30, the state of the CPU 30 is recovered from the sleep state. Specifically, even during the output of the first signal, the CPU 30 returns the state of the sleep register to the initial state and releases the sleep state.

If the sleep state is released during the output of the first signal, the output of the first signal may stop in the middle. For this reason, a pulse of the first signal is excessively short and the timer IC 38 may not detect the first signal. The CPU 30 does not output the first signal again, under the assumption that the CPU 30 already completes to output the first signal once the output of the first signal from the CPU 30 starts.

In addition to the internal event, if a problem is generated in the CPU 30 or the power saving transition notification signal line 62 during the output of the first signal, the output of the first signal is interrupted. For this reason, the timer IC 38 may not detect the first signal, similar to the above described case.

However, in the first exemplary embodiment, the timer start signal is output from the CPU 30 to the timer IC 38, and the timer 26 receives the timer start signal and starts the count operation. When the timer 26 times out, the signal output unit 28 generates and outputs the second signal. Thereby, the ASIC 34 receives the second signal from the timer IC 38, turns off the FET 32, and stops the supply of power to the CPU 30.

When the CPU 30 transitions to the second state, even though an internal event or a problem is occurred in the CPU 30, the series of processes that are needed to transit the CPU 30 from the first state to the second state is already completed. Therefore, a problem is not occurred even though the CPU 20 is not reset and transitions to the second state. Accordingly, as described above, the transition of the CPU 30 to the second state is continued.

In the configuration where the timer IC 38 is not provided and the power saving transition notification signal is directly output from the CPU 30 to the ASIC 34, even when an abnormality is occurred at the corresponding timing, the pulse of the power saving transition notification signal is excessively short, and the ASIC 34 may not detect the signal. Since the ASIC 34 is isolated from the PCI bus 46, an access is disabled from the CPU 30 to the ASIC 34, and the CPU 30 may not change the setting of the ASIC 34. The ASIC 34 is designed to be operated in the predetermined order. For example, after the ASIC 34 is isolated from the PCI bus 46 in process (4), only when the ASIC 34 receives the power saving transition notification signal and transitions the CPU 30 to the second state, the ASIC 34 may perform the following operation. For this reason, the ASIC 34 continues to wait for the power saving transition information signal to be received, and the controller 12 may transit to a hang-up state.

However, as in the first exemplary embodiment, because the timer IC 38 is provided, even though an abnormality is occurred in the CPU 30 after the ASIC 34 is isolated from the PCI bus 46, the CPU 30 transitions from the first state to the second state, and the hang-up is prevented.

The case where the first signal and the second signal are generated to become the signals (power saving transition notification signals) having the same waveform is exemplified. However, if the ASIC 34 is configured to turn off the FET 32 when receiving the second signal, the first signal and the second signal may be the different signals.

A process of when an external event is occurred in the case where the CPU 30 is in the second state will be described.

The ASIC 34 turns off the FET 32, restarts the supply of power to the CPU 30, and transitions the CPU 30 to the first state. After the CPU 30 transitions to the first state, processes (6) to (9) that are needed after the transition are performed. Hereinafter, processes (6) to (9) that are needed after the transition are called post-processing.

(6) The ASIC 34 releases the isolation from the PCI bus 46 and may communicate with the CPU 30 through the PCI bus 46. When the ASIC 34 releases the isolation, the ASIC 34 notifies the CPU 30 of the release of the isolation through the PCI bus 46. Then, the CPU 30 initializes its state.

(7) The CPU 30 reads the state data that is saved in the RAM 42, stores the state data in such as the internal register, and sets the state.

(8) The CPU 30 outputs the control signal to the ASIC 34 through the PCI bus 46, rewrites the value of the register defining the mask signal output provided in the ASIC 34 such that the mask signal is not output from the ASIC 34, and changes the setting of the ASIC 34.

(9) The CPU 30 outputs the control signal to the ASIC 34 through the PCI bus 46, rewrites the value of the register defining the interrupt work provided in the ASIC 34 such that the first interrupt work is performed, and changes the setting.

After the post-processing, the ASIC 34 notifies the CPU 30 of the occurrence of the external event through the PCI bus 46. According to the notified external event, the CPU 30 transitions the image forming apparatus 10 from the second power saving state to the first power saving state or transitions the image forming apparatus 10 to the non-power saving state and executes a process according to the external event.

After setting the sleep state of the CPU 30, if an abnormality is occurred and the CPU 30 and the ASIC 34 are reset, time is needed to perform the work for acquiring the state data and setting the state after the initialization and repeat the processes after the above process (1) and the followings to transit the CPU 30 from the first state to the second state. However, as described in the first exemplary embodiment, since the CPU 30 transitions from the first state to the second state without being reset, the time needed for the transition is reduced as compared with the case where the CPU 30 is reset.

Second Exemplary Embodiment

In the first exemplary embodiment, as the signal that is needed to cause the timer 26 of the timer IC 38 to start the count operation, the time start signal is used. However, in the second exemplary embodiment, the case where, instead of the timer start signal, a mask signal is used to start the timer 26 is exemplified. Since the image forming apparatus 10 according to the second exemplary embodiment has the same configuration as that of the image forming apparatus 10 according to the first exemplary embodiment except for the configuration of the controller 12, the detailed description thereof is omitted. In order to discriminate the controller according to the second exemplary embodiment from the controller 12 according to the first exemplary embodiment, the controller according to the second exemplary embodiment is called a controller 12A by adding a symbol A to a tail of the reference numeral 12.

Figure 4:
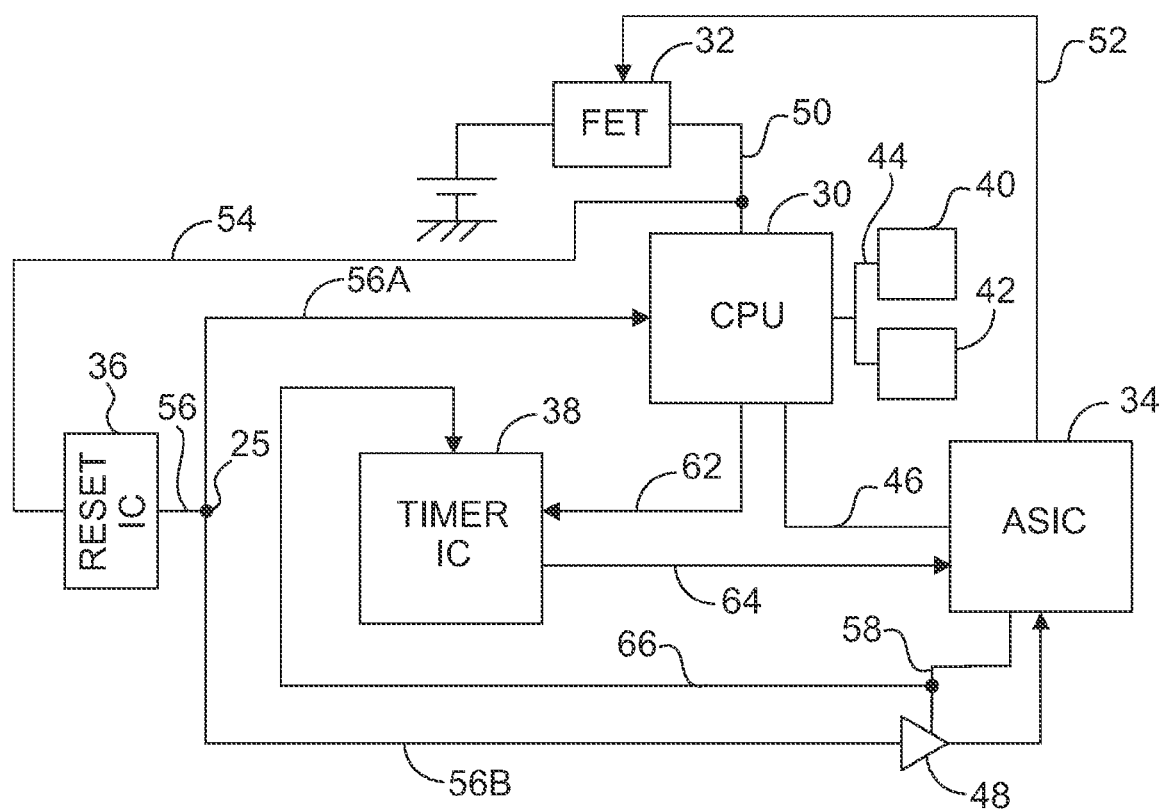
FIG. 4 is a diagram illustrating the configuration of a controller according to the second exemplary embodiment.

FIG. 4 illustrates the configuration of the controller 12A according to the second exemplary embodiment. In FIG. 4, the components that are equal or equivalent to the components of FIG. 2 are denoted by the same reference numerals, and the description thereof is omitted.

In the controller 12A according to the second exemplary embodiment, a mask signal monitor line 66 is provided, instead of the timer start signal line 60. One end of the mask signal monitor line 66 is connected to a mask line 58 and the other end is connected to the timer IC 38. If the mask signal is output from the ASIC 34 to the buffer 48 through the mask line 58, the mask signal is transmitted also to the mask signal monitor line 66 that is connected to the mask line 58.

In the second exemplary embodiment, when the signal receiving unit 22 receives (detects) the mask signal from the mask signal monitor line 66, the timer 26 sets the predetermined time T2 to start the count operation. When the mask signal is output before the output of the timer start signal described in the first exemplary embodiment, the time T2 is set to be longer than the time T1.

A control flow of the CPU 30 according to the second exemplary embodiment transiting from the first state to the second state is the same as the case of the first exemplary embodiment, except that the timer start signal is not output and the count operation of the timer 26 starts when the mask signal is output from the ASIC 34 by process (3). Therefore, the detailed description thereof is omitted.

Third Exemplary Embodiment

In the third exemplary embodiment, the case where a signal line to output a first signal and a signal line to output a second signal are coupled by wired OR connection and a power saving transition notification signal is output to the ASIC 34 will be exemplified. Since the image forming apparatus 10 according to the third exemplary embodiment has the same configuration as that of the image forming apparatus 10 according to the first exemplary embodiment except for the configuration of the controller 12, the detailed description thereof is omitted. In order to discriminate the controller according to the third exemplary embodiment from the controller 12 according to the first exemplary embodiment, the controller according to the third exemplary embodiment is called a controller 12B by adding a symbol B to a tail of the reference numeral 12.

Figure 5:
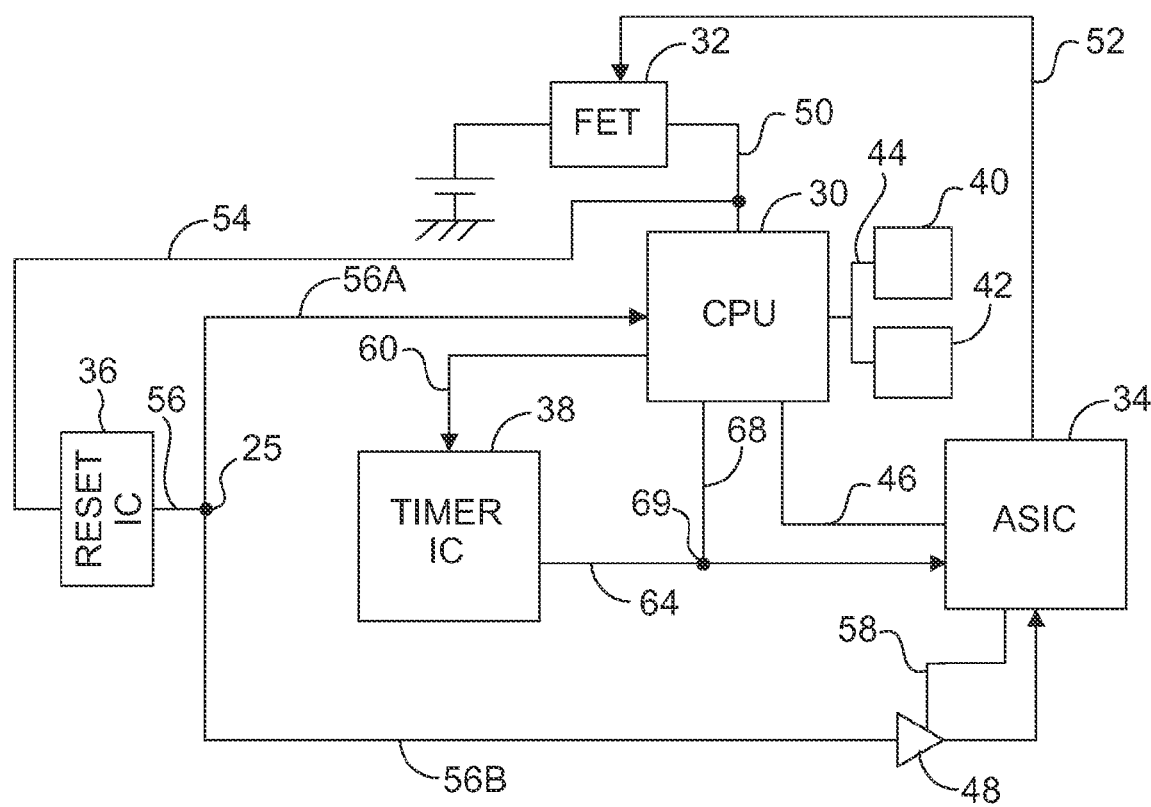
FIG. 5 is a diagram illustrating the configuration of a controller according to the third exemplary embodiment.

FIG. 5 illustrates the configuration of the controller 12B according to the third exemplary embodiment. In FIG. 5, the components that are equal or equivalent to the components of FIG. 2 are denoted by the same reference numerals, and the description thereof is omitted.

In the controller 12B according to the third exemplary embodiment, a power saving transition notification signal line 68 is provided, instead of the power saving transition notification signal line 62. One end of the power saving transition notification signal line 68 is connected to the CPU 30 and the other end is connected to a contact 69 of the power saving transition notification signal line 64.

The second signal that is generated by the timer IC 38 is output to the ASIC 34 through the power saving transition notification signal line 64. However, the first signal that is generated by the CPU 30 is output to the power saving transition notification signal line 68 and reaches the contact 69. Then, the first signal is output to the ASIC 34 through the power saving transition notification signal line 64.

As described above, since the first signal and the second signal are generated as signals (power saving transition notification signals) having the same waveforms and output, the FET 32 is turned off, when any either one of the first signal or the second signal is received by the ASIC 34.

For example, when the ASIC 34 is operated by negative logic (active low), and configured to detect a falling edge of a pulse signal and to receive a signal, both of the first signal and the second signal that are pulse signals having a falling edge and having an enough pulse width needed for the ASIC 34 to detect the edge, the signals may have different pulse widths. When the ASIC 34 is operated by negative logic (active low), and configured to receive a signal only when detecting a falling edge of a pulse signal and detecting an L level by the predetermined length subsequent to the edge, both of the first signal and the second signal that are pulse signals having a falling edge and having an enough a pulse width of the L level needed for the ASIC 34 to detect the edge, the signals may have different pulse widths.

In the third exemplary embodiment, even though the first signal and the second signal are output and synthesized at the contact 69 and the pulse width of the signal increases, if the falling edge of the arrived pulse signal is detected in the ASIC 34 (or if the falling edge and the L level of the predetermined length or more are detected), the ASIC 34 turns off the FET 32 according to the signal. Therefore, the ASIC 34 operates without causing a problem.

Similar to the above case, when the ASIC 34 is operated by positive logic (active high) and configured to detect a rising edge of a pulse signal and to receives a signal, both of the first signal and the second signal that are pulse signals having a rising edge and having an enough pulse width needed for the ASIC 34 to detects the edge, the signals may have different pulse widths. Even when the ASIC 34 is operated by positive logic (active high), and configured to only receive a signal when detecting a rising edge of a pulse signal, and detecting an H level by the predetermined length subsequent to the edge, both of the first signal and the second signal that are pulse signals having a rising edge may and having an enough pulse width of the H level needed for the ASIC 34 to detect the edge, the signals may have different pulse widths.

A control flow of the CPU 30 according to the third exemplary embodiment transiting from the first state to the second state is the same as that of the first exemplary embodiment, except that the CPU 30 uses the signal line to output the first signal as the power saving transition notification signal line 68 in the first exemplary embodiment. Therefore, the detailed description thereof is omitted.

In the controller 12B according to the third exemplary embodiment, the mask signal monitor line 66 described in the second exemplary embodiment may be provided, instead of the timer start signal line 60. That is, as in the third exemplary embodiment, in the configuration where the signal lines are coupled by the wired OR connection, the mask signal may be used as a trigger that starts the timer 26 of the timer IC 38.

One end of the power saving transition notification signal line 68 may be connected to the CPU 30 and the other end thereof may be connected to the ASIC 34, the power saving transition notification signal line 68 and the power saving transition notification signal line 64 may not be connected with each other and they may be respectively connected to the ASIC 34.

When the ASIC 34 receives either the first signal from the power saving transition notification signal line 68 or the second signal from the power saving transition notification signal line 64, the ASIC 34 turns off the FET 32. After the ASIC 34 receives the signal from either one of the power saving transition notification signal lines and turns off the FET 32, when the ASIC 34 further receives the signal from the other, the ASIC 34 may configured not to perform the control operation to turn off the FET 32 again.

Fourth Exemplary Embodiment

In the first to third exemplary embodiments, the configuration where the timer IC 38 is provided and controlled by hardware is described. However, the configuration may be controlled by software.

Specifically, the operation of the timer IC 38 is realized by executing a program by the CPU 30. For example, in FIGS. 2, 4, and 5, a CPU (hereinafter, referred to as a second CPU) that is different from the CPU 30 is provided, instead of the timer IC 38, a memory is connected to the second CPU, and the program that is executed by the second CPU is stored in the memory in advance.

Figure 6:
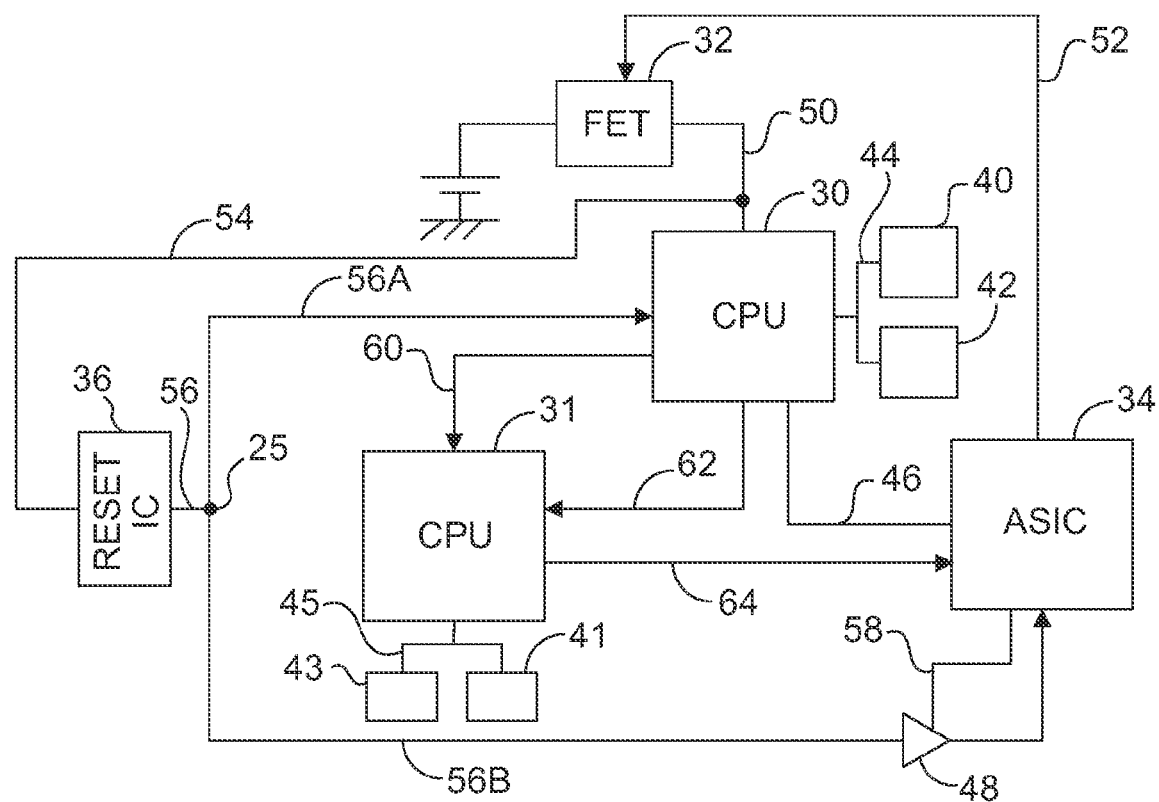
FIG. 6 is a diagram illustrating the configuration of a controller according to the fourth exemplary embodiment.

FIG. 6 illustrates the configuration of the case where the timer IC 38 of the controller 12 in FIG. 2 is replaced by a second CPU 31. Similar to the timer IC 38, the second CPU 31 is connected to the CPU 30 through the timer start signal line 60 and the power saving transition notification signal line 62, and is connected to the ASIC 34 through the power saving transition notification signal line 64. A ROM 41 and a RAM 43 are connected to the second CPU 31 through a system bus 45. The ROM 41 stores the program that is executed by the CPU 31, and the RAM 43 is used as a work memory of the CPU 31. A storage medium that stores the program executed by the CPU 31 is not limited to the ROM, and may be a hard disk drive (HDD) or a flash memory.

Figure 7:
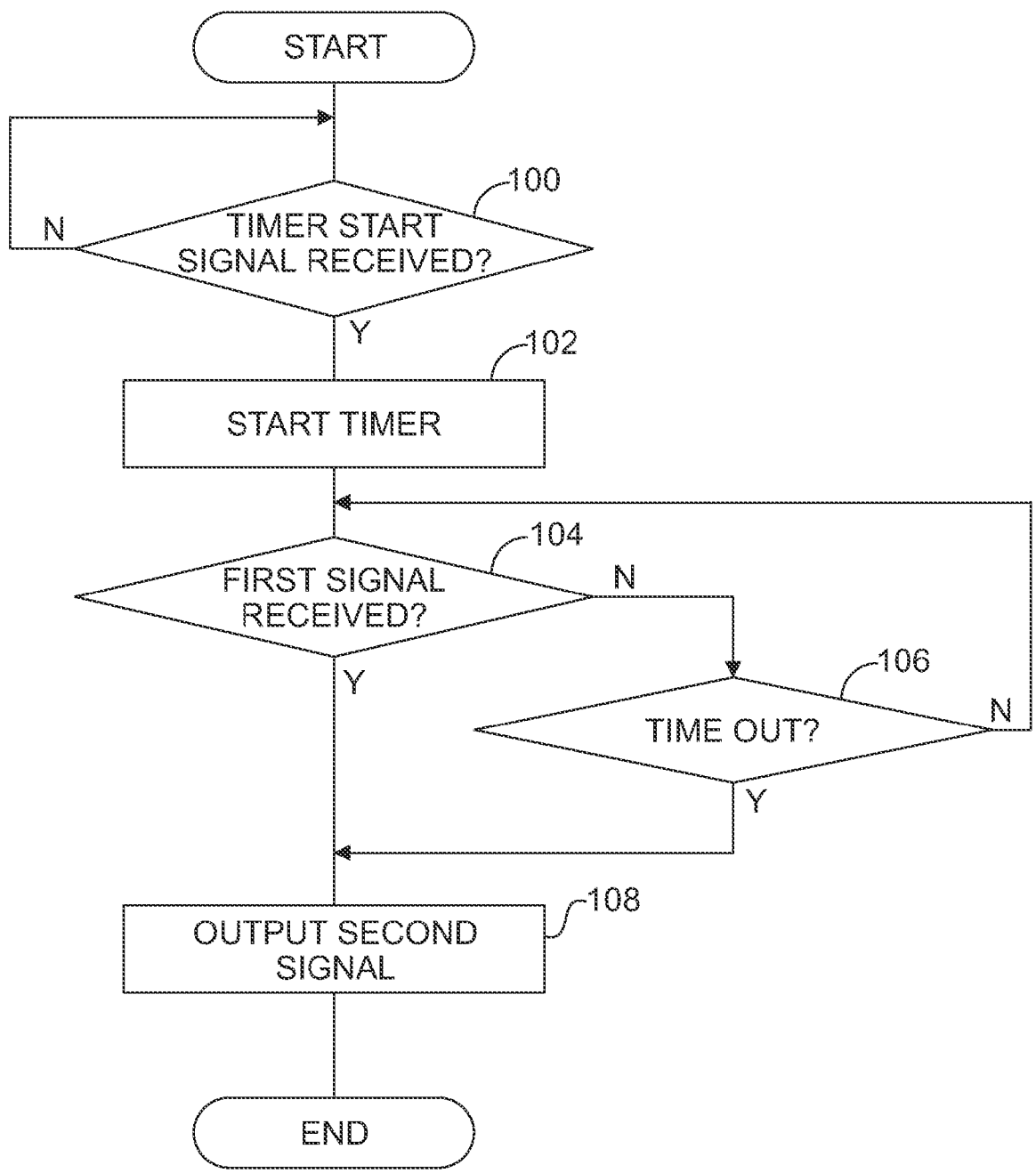
FIG. 7 is a flowchart illustrating a process routine of when a function of the timer IC according to the first exemplary embodiment is executed by a second CPU.

FIG. 7 is a flowchart illustrating a process routine of when the function of the timer IC 38 according to the first exemplary embodiment is executed by the second CPU.

In step 100, it is determined whether the timer start signal is received from the CPU 30. When it is determined that the timer start signal is received, the process proceeds to step 102, the predetermined time is set, and the count operation of the timer that is provided in the second CPU starts.

In step 104, it is determined whether the first signal is received from the CPU 30. When it is determined that the first signal is received, the process proceeds to step 108 and the second signal is output to the ASIC 34.

Meanwhile, in step 104, when it is determined that the first signal is not received from the CPU 30, it is determined whether the timer times out in step 106. When it is determined that the timer does not time out, the process returns to step 104. When it is determined that the timer times out, the process proceeds to step 108 and the second signal is output to the ASIC 34.

When the function of the timer IC 38 according to the second exemplary embodiment is executed by the second CPU, it is determined whether the mask signal is received in the process of step 100. When it is determined that the mask signal is received, the process proceeds to step 102.

Figure 8:
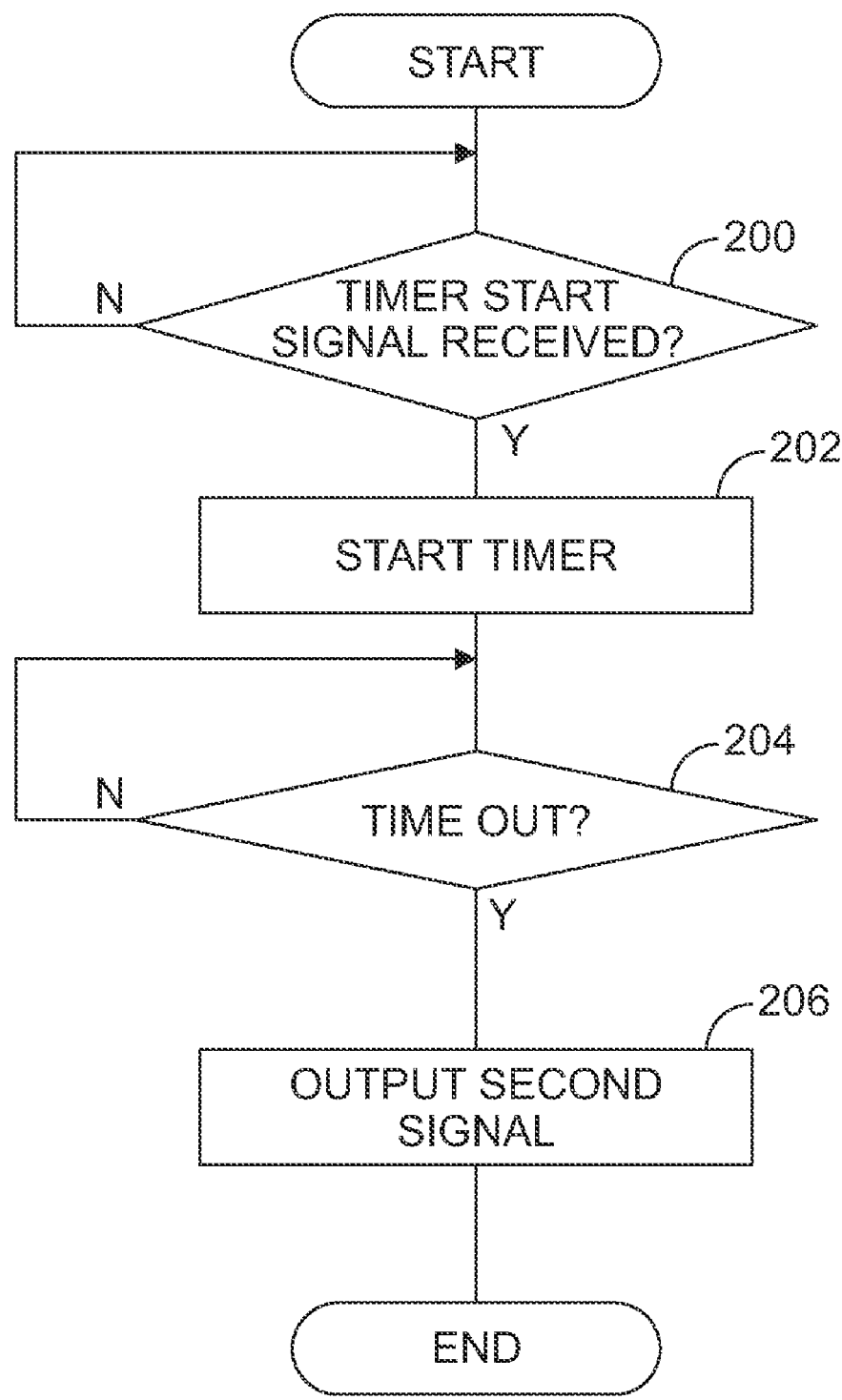
FIG. 8 is a flowchart illustrating a process routine of when a function of the timer IC according to the third exemplary embodiment is executed by the second CPU.

FIG. 8 is a flowchart illustrating a process routine of when the function of the timer IC 38 according to the third exemplary embodiment is executed by the second CPU.

In step 200, it is determined whether the timer start signal is received from the CPU 30. When it is determined that the timer start signal is received, the process proceeds to step 202, the predetermined time is set, and the count operation of the timer that is provided in the second CPU starts.

In step 204, it is determined whether the timer times out. It continues to wait until the timer is determined to time out, then the process proceeds to step 206 and the second signal is output to the ASIC 34.

When the mask signal is received and the timer starts, it is determined whether the mask signal is received in the process of step 200. When it is determined that the mask signal is received, the process proceeds to step 202.

Fifth Exemplary Embodiment

In the fifth exemplary embodiment, during a period (hereinafter, referred to as period A) from the preprocessing starts to the CPU completely transitions to the second state and a period (hereinafter, referred to as period B) from the post-processing starts to the post-processing ends, when an abnormality is occurred, the timer IC detects the abnormality and performs control according to a period of time where the abnormality is detected. The timer IC will be specifically described.

Since the image forming apparatus 10 according to the fifth exemplary embodiment has the same configuration as that of the image forming apparatus 10 according to the first exemplary embodiment except for the configuration of the controller 12, the detailed description thereof is omitted. In order to discriminate the controller according to the fifth exemplary embodiment from the controller 12 according to the first exemplary embodiment, the controller according to the fifth exemplary embodiment is called a controller 12C by adding a symbol C to a tail of the reference numeral 12.

Figure 9:
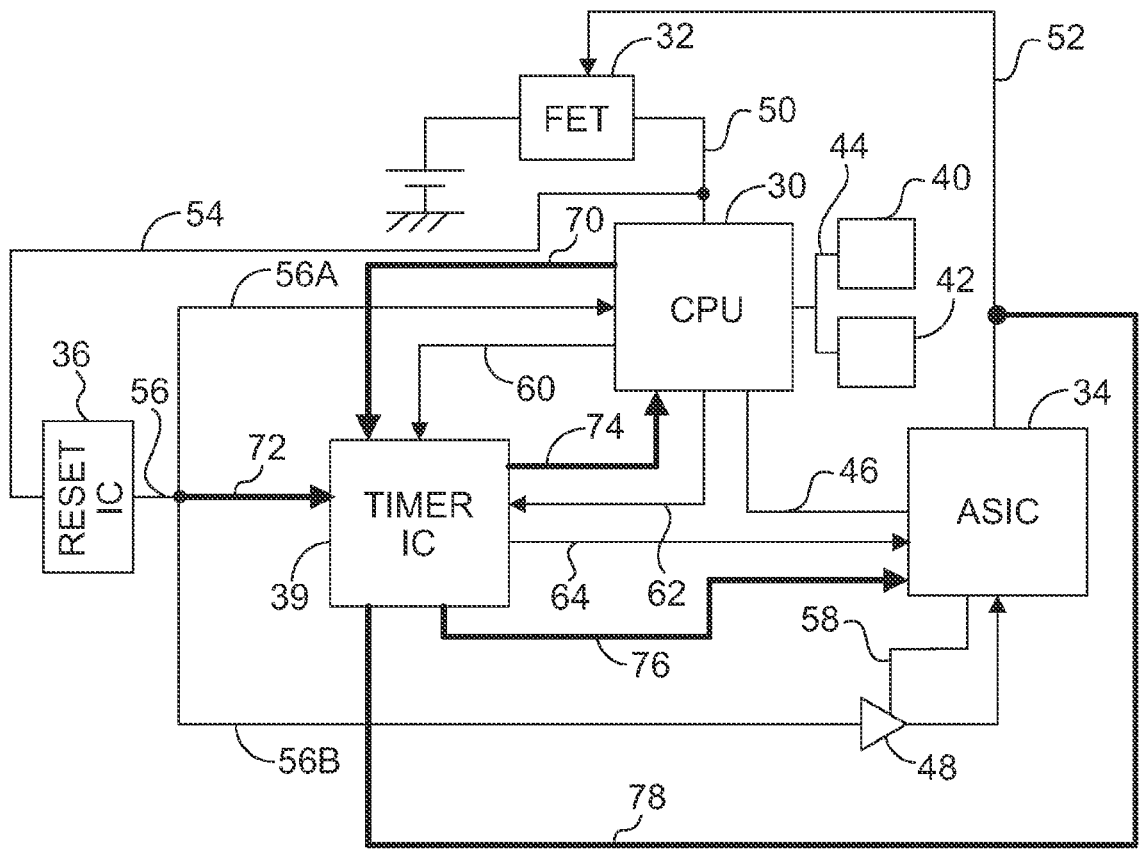
FIG. 9 is a diagram illustrating the configuration of a controller according to the fifth exemplary embodiment.

FIG. 9 illustrates the configuration of the controller 12C according to the fifth exemplary embodiment. In FIG. 9, portions that are illustrated by a thick line are components that are newly added to the configuration of FIG. 2. The components that are equal or equivalent to the components of FIG. 2 are denoted by the same reference numerals, and the description thereof is omitted.

In the controller 12C according to the fifth exemplary embodiment, a timer IC 39 is provided, instead of the timer IC 38. In addition to the same function as that of the timer IC 38 according to the first exemplary embodiment, the timer IC 39 detects the abnormality occurred in the periods A and B and performs control according to a period of time where the abnormality is detected.

In the controller 12C, a situation transmission line 70 is provided. One end of the situation transmission line 70 is connected to the CPU 30 and the other end is connected to the timer IC 39. The CPU 30 transmits a situation signal to transmit a process progress situation to the timer IC 39 through the situation transmission line 70.

In the controller 12C, a reset signal monitor line 72 is provided. One end of the reset signal monitor line 72 is connected to a reset signal line 56 and the other end is connected to the timer IC 39. In the reset signal monitor line 72, the reset signal that is output from the reset IC 36 is transmitted. The timer IC 39 monitors whether the reset signal is output from the reset IC 36 by the reset signal monitor line 72.

In the controller 12C, a reset signal line 74 is provided. One end of the reset signal line 74 is connected to the CPU 30 and the other end is connected to the timer IC 39. The timer IC 39 outputs a reset signal to reset the CPU 30 to the CPU 30 though the reset signal line 74.

In the controller 12C, a reset signal line 76 is provided. One end of the reset signal line 76 is connected to the ASIC 34 and the other end is connected to the timer IC 39. The timer IC 39 outputs a reset signal to reset the ASIC 34 to the ASIC 34 through the reset signal line 76.

In the controller 12C, a control line 78 is provided. One end of the control line 78 is connected to the timer IC 39 and the other end is connected to the control line 52. The timer IC 39 outputs a control signal to turn on/off the FET 32 to the FET 32 through the control line 78 and the control line 52.

Figure 10:
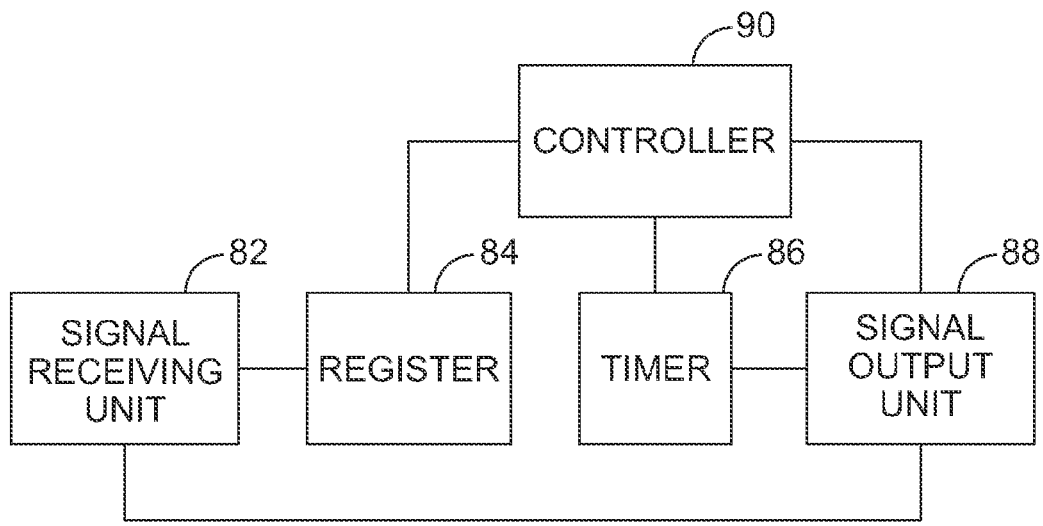
FIG. 10 is a diagram illustrating the functional configuration of a timer IC according to the fifth exemplary embodiment.

FIG. 10 illustrates the function configuration of the timer IC 39.

The timer IC 39 includes a signal receiving unit 82, a register group 84, a timer 86, a signal output unit 88, and a controller 90.

The register group 84 includes plural registers (storage areas). In the fifth exemplary embodiment, 10 registers are provided. The registers are sequentially called a register R1, a register R2, . . . , and a register R10. An initial value of each register is set to 0.

The signal receiving unit 82 detects and receives a timer start signal that is output from the CPU 30 through the timer start signal line 60, a first signal that is output from the CPU 30 through the power saving transition notification signal line 62, a situation signal that is output from the CPU 30 through the situation transmission line 70, and a reset signal that is output from the reset IC 36 through the reset signal monitor line 72 respectively. The signal receiving unit 82 rewrites values of the registers of the register group 84 according to the received signals. When the signal receiving unit 82 receives the first signal from the CPU 30 and receives the reset signal from the reset IC 36, the signal receiving unit 82 notifies the signal output unit 88 of the reception of the signals.

If the timeout time is set, the timer 86 starts the count operation. If the timer 86 times out, the timer 86 notifies the signal output unit 88 and the controller 90 of the timeout.

The signal output unit 88 generates a signal set by the controller 90 and outputs the signal.

When the values of the register group 84 are rewritten, the controller 90 sets the timeout signal to the timer 86 according to the rewritten values, starts the count operation of the timer 86, and sets the signal that is generated and output by the signal output unit 88. When the signal output unit 88 outputs the reset signal, the controller 90 initializes the value of each register of the register group 84 and sets the value to "0".

Hereinafter, the function of the controller 12C according to the fifth exemplary embodiment will be described in detail.

In the fifth exemplary embodiment, the period A is divided into 6 periods and an occurrence of abnormality is monitored. Processes (1) to (5) to be described below correspond to the processes (1) to (5) described in the first exemplary embodiment.

First period: a period between a time process (1) starts and a time process (1) ends Second period: a period between a time process (2) starts and process (2) ends Third period: a period between a time process (3) starts and a time process (3) ends Fourth period: a period between a time process (4) starts and a time process (4) ends Fifth period: a period between a time process (5) starts and a time process (5) ends Sixth period: a period between a time the second signal is output from the timer IC 39 and a time the reset signal is detected by the reset signal monitor line 72

The period B is divided into 4 periods and an occurrence of abnormality is monitored. Processes (6) to (9) to be described below correspond to the processes (6) to (9) described in the first exemplary embodiment.

Seventh period: a period between a time process (6) ends and a time the notification of the isolate release is received from the ASIC 34 in process (6)

Eighth period: a period between a time process (7) starts and a time process (7) ends Ninth period: a period between a time process (8) starts and a time process (8) ends Tenth period: a period between a time process (9) starts and a time process (9) ends The operation during the period A will be described.

The CPU 30 outputs the situation signal through the situation transmission line 70, when process (1) starts. When the signal receiving unit 82 receives the situation signal from the CPU 30 through the situation transmission line 70, the signal receiving unit 82 writes "1" in the register R1. If "1" is written in the register R1, the controller 90 sets a timeout time Ta corresponding to the first period to the timer 86 and starts the count operation. The controller 90 sets a signal (reset signal to reset the CPU 30 and the ASIC 34), which is output when an abnormality is occurred during the first period, to the signal output unit 88.

The CPU 30 outputs the situation signal through the situation transmission line 70, when process (2) starts. When the signal receiving unit 82 receives the situation signal from the CPU 30 through the situation transmission line 70, the signal receiving unit 82 writes "1" in the register R2. When "1" is written in the register R2, the controller 90 sets a timeout time Tb corresponding to the second period to the timer 86 and starts the count operation. The controller 90 sets a signal (reset signal to reset the CPU 30 and the ASIC 34), which is output when an abnormality is occurred during the second period, to the signal output unit 88.

The CPU 30 outputs the situation signal through the situation transmission line 70, when process (3) starts. When the signal receiving unit 82 receives the situation signal from the CPU 30 through the situation transmission line 70, the signal receiving unit 82 writes "1" in the register R3. If "1" is written in the register R3, the controller 90 sets a timeout time Tc corresponding to the third period to the timer 86 and starts the count operation. The controller 90 sets a signal (reset signal to reset the CPU 30 and the ASIC 34), which is output when an abnormality is occurred during the third period, to the signal output unit 88.

The CPU 30 outputs the situation signal through the situation transmission line 70, when process (4) starts. When the signal receiving unit 82 receives the situation signal from the CPU 30 through the situation transmission line 70, the signal receiving unit 82 writes "1" in the register R4. When "1" is written in the register R4, the controller 90 sets a timeout time Td corresponding to the fourth period to the timer 86 and starts the count operation. The controller 90 sets a signal (reset signal to reset the CPU 30 and the ASIC 34), which is output when an abnormality is occurred during the fourth period, to the signal output unit 88.

When the state of the CPU 30 is set to the sleep state in process (5), the timer start signal is output from the CPU 30 through the timer start signal line 60. When the signal receiving unit 82 receives the timer start signal from the CPU 30 through the timer start signal line 60, the signal receiving unit 82 writes "1" in the register R5. When "1" is written in the register R5, the controller 90 sets a timeout time Te corresponding to the fifth period to the timer 86 and starts the count operation. The controller 90 sets a signal (second signal), which is output when an abnormality is occurred during the fifth period or when the first signal is output from the CPU 30, to the signal output unit 88.

When the second signal is output from the timer IC 39, the controller 90 writes "1" in the register R6. When "1" is written in the register R6, the controller 90 sets a timeout time Tf corresponding to the sixth period to the timer 86 and starts the count operation. The controller 90 sets a signal (control signal to turn off the FET 32), which is output when an abnormality is occurred during the sixth period, to the signal output unit 88.

Each timeout time is set as time that is the predetermined time longer than the time needed when the process is normally executed in the first to sixth periods. When the time longer than the timeout time is needed to execute the process in each period, the timer 86 times out and it is determined that an abnormality is occurred.

When the timer 86 times out, the notification of the timeout of the timer is output to the signal output unit 88. When the signal output unit 88 receives the notification, the signal output unit 88 generates the signal set by the controller 90 and outputs the signal. Hereinafter, the process for outputting the signal will be specifically described.

When the timer 86 times out after "1" is written in the register R1 before the value of the register R2 changes to "1", this indicates that an abnormality is occurred in the CPU 30 during the first period, the reset signal is output to the CPU 30 through the reset signal line 74, and the reset signal is output to the ASIC 34 through the reset signal line 76.

When the timer 86 times out after "1" is written in the register R2 before the value of the register R3 changes to "1", this indicates that an abnormality is occurred in the CPU 30 during the second period, the reset signal is output to the CPU 30 through the reset signal line 74, and the reset signal is output to the ASIC 34 through the reset signal line 76.

When the timer 86 times out after "1" is written in the register R3 before the value of the register R4 changes to "1", this indicates that an abnormality is occurred in the CPU 30 during the third period, the reset signal is output to the CPU 30 through the reset signal line 74, and the reset signal is output to the ASIC 34 through the reset signal line 76.

When the timer 86 times out after "1" is written in the register R4 before the value of the register R5 changes to "1", this indicates that an abnormality is occurred in the CPU 30 during the fourth period, the reset signal is output to the CPU 30 through the reset signal line 74, and the reset signal is output to the ASIC 34 through the reset signal line 76.

As such, when an abnormality is detected in the first to fourth periods, this indicates that an abnormality is occurred in a step where the process required for the transition does not complete. Therefore, in the fifth exemplary embodiment, the CPU 30 does not transit to the second state but the CPU 30 and the ASIC 34 are reset. If the CPU 30 and the ASIC 34 are reset, the states thereof may be matched with each other.

When the reset signal is output from the signal output unit 88, the controller 90 returns the value of each register of the register group 84 to the initial value "0".

In the first to fourth periods, when the process of each period normally ends, a timeout period of a next period is set to the timer 86 before the timer 86 times out and the count operation starts. Therefore, the reset signal is not output from the signal output unit 88.

When the timer 86 times out after "1" is written in the register R5 before the value of the register R6 changes to "1", this indicates that an abnormality is occurred in the CPU 30 during the fifth period, and the second signal is output to the CPU 30 through the power saving transition notification signal line 64. Even when the signal receiving unit 82 receives the first signal from the CPU 30 before the timeout, the second signal is output.

The control during the fifth period corresponds to the controls described in the first to fourth exemplary embodiments.

When the timer 86 times out after "1" is written in the register R6 before the signal receiving unit 82 receives the reset signal through the reset signal monitor line 72, this indicates that an abnormality is occurred in the ASIC 34 during the sixth period, and the control signal is output through the control line 78 and the FET 32 is turned off. That is, when the signal receiving unit 82 does not receive the reset signal, this indicates that the supply of power to the CPU 30 is not stopped, even though the second signal is output. Therefore, the control signal is output to the FET 32 instead of the ASIC 34, and the FET 32 is turned off. When the signal receiving unit 82 receives the reset signal before the timer 86 times out, the power supply of the CPU 30 is normally turned off, and the count operation of the timer 86 is stopped.

The operation during the period B will be described.

The CPU 30 outputs the situation signal through the situation transmission line 70, when the notification of the release of the isolation from the PCI bus 46 is received from the ASIC 34 in process (6). When the signal receiving unit 82 receives the situation signal from the CPU 30 through the situation transmission line 70, the signal receiving unit 82 writes "1" in the register R7. If "1" is written in the register R7, the controller 90 sets a timeout time Tg corresponding to the seventh period to the timer 86 and starts the count operation. The controller 90 sets a signal (reset signal to reset the CPU 30 and the ASIC 34), which is output when an abnormality is occurred during the seventh period, to the signal output unit 88.

The CPU 30 outputs the situation signal through the situation transmission line 70, when process (7) starts. When the signal receiving unit 82 receives the situation signal from the CPU 30 through the situation transmission line 70, the signal receiving unit 82 writes "1" in the register R8. When "1" is written in the register R8, the controller 90 sets a timeout time Th corresponding to the eighth period to the timer 86 and starts the count operation. The controller 90 sets a signal (reset signal to reset the CPU 30 and the ASIC 34), which is output when an abnormality is occurred during the eighth period, to the signal output unit 88.

The CPU 30 outputs the situation signal through the situation transmission line 70, when process (8) starts. When the signal receiving unit 82 receives the situation signal from the CPU 30 through the situation transmission line 70, the signal receiving unit 82 writes "1" in the register R9. If "1" is written in the register R9, the controller 90 sets a timeout time Ti corresponding to the ninth period to the timer 86 and starts the count operation. The controller 90 sets a signal (reset signal to reset the CPU 30 and the ASIC 34), which is output when an abnormality is occurred during the ninth period, to the signal output unit 88.

The CPU 30 outputs the situation signal through the situation transmission line 70, when process (9) starts. When the signal receiving unit 82 receives the situation signal from the CPU 30 through the situation transmission line 70, the signal receiving unit 82 writes "1" in the register R10. When "1" is written in the register R10, the controller 90 sets a timeout time Tj corresponding to the tenth period to the timer 86 and starts the count operation. The controller 90 sets a signal (reset signal for resetting the CPU 30 and the ASIC 34), which is output when an abnormality is occurred during the tenth period, to the signal output unit 88.

The CPU 30 outputs the situation signal through the situation transmission line 70, when process (9) ends. When the signal receiving unit 82 receives the situation signal from the CPU 30 through the situation transmission line 70, the controller 90 stops the count operation of the timer 86.

Each timeout time is set as time that is the predetermined time longer than the time needed when the process is normally executed in the seventh to tenth periods. When the time longer than the timeout time is needed to execute the process in each period, the timer 86 times out and it is determined that an abnormality is occurred.

When the timer 86 times out, the notification of the timeout of the timer is output to the signal output unit 88. When the signal output unit 88 receives the notification, the signal output unit 88 generates the signal set by the controller 90 and outputs the signal. Hereinafter, the process of the signal output unit 88 during the period B will be specifically described.

When the timer 86 times out after "1" is written in the register R7 before the value of the register R8 changes to "1", this indicates that an abnormality is occurred in the CPU 30 during the seventh period, the reset signal is output to the CPU 30 through the reset signal line 74, and the reset signal is output to the ASIC 34 through the reset signal line 76.

When the timer 86 times out after "1" is written in the register R8 before the value of the register R9 changes to "1", this indicates that an abnormality is occurred in the CPU 30 during the eighth period, the reset signal is output to the CPU 30 through the reset signal line 74, and the reset signal is output to the ASIC 34 through the reset signal line 76.

When the timer 86 times out after "1" is written in the register R9 before the value of the register R10 changes to "1", this indicates that an abnormality is occurred in the CPU 30 during the ninth period, the reset signal is output to the CPU 30 through the reset signal line 74, and the reset signal is output to the ASIC 34 through the reset signal line 76.

When the timer 86 times out after "1" is written in the register R10, this indicates that an abnormality is occurred in the CPU 30 during the tenth period, the reset signal is output to the CPU 30 through the reset signal line 74, and the reset signal is output to the ASIC 34 through the reset signal line 76.

When the reset signal is output from the signal output unit 88, the controller 90 returns the value of each register of the register group 84 to the initial value "0".

From the seventh to ninth periods, when the process of each period normally ends, a timeout period of a next period is set to the timer 86 before the timer 86 times out, and the count operation starts. Therefore, the reset signal is not output from the signal output unit 88. When the process normally ends in the tenth period, the timer 86 is stopped, and the reset signal is not output from the signal output unit 88.

As described above, in the fifth exemplary embodiment, if a next situation signal (or the reset signal or the first signal) is not received until the timer 86 times out after the timer 86 starts (until the set time elapses), the controller determines that an abnormality is occurred in the corresponding period and performs the control operation. The control contents depend on the period of time where an abnormality is occurred.

The timer IC 38 according to the second and third exemplary embodiments may be replaced by the timer IC 39 according to the fifth exemplary embodiment, and the situation transmission line 70, the reset signal monitor line 72, the reset signal line 74, the reset signal line 76, and the control line 78 may be provided to constitute the controller.

The process of the timer IC 39 may be executed by the software.

Specifically, the operation of the timer IC 39 is realized by executing a program by the CPU 30. For example, similar to the configuration of FIG. 6, in FIG. 9, a CPU (hereinafter, referred to as a second CPU) that is different from the CPU 30 is provided, instead of the timer IC 39, a memory is connected to the second CPU, and the program that is executed by the second CPU is stored in the memory in advance.

Figure 11:
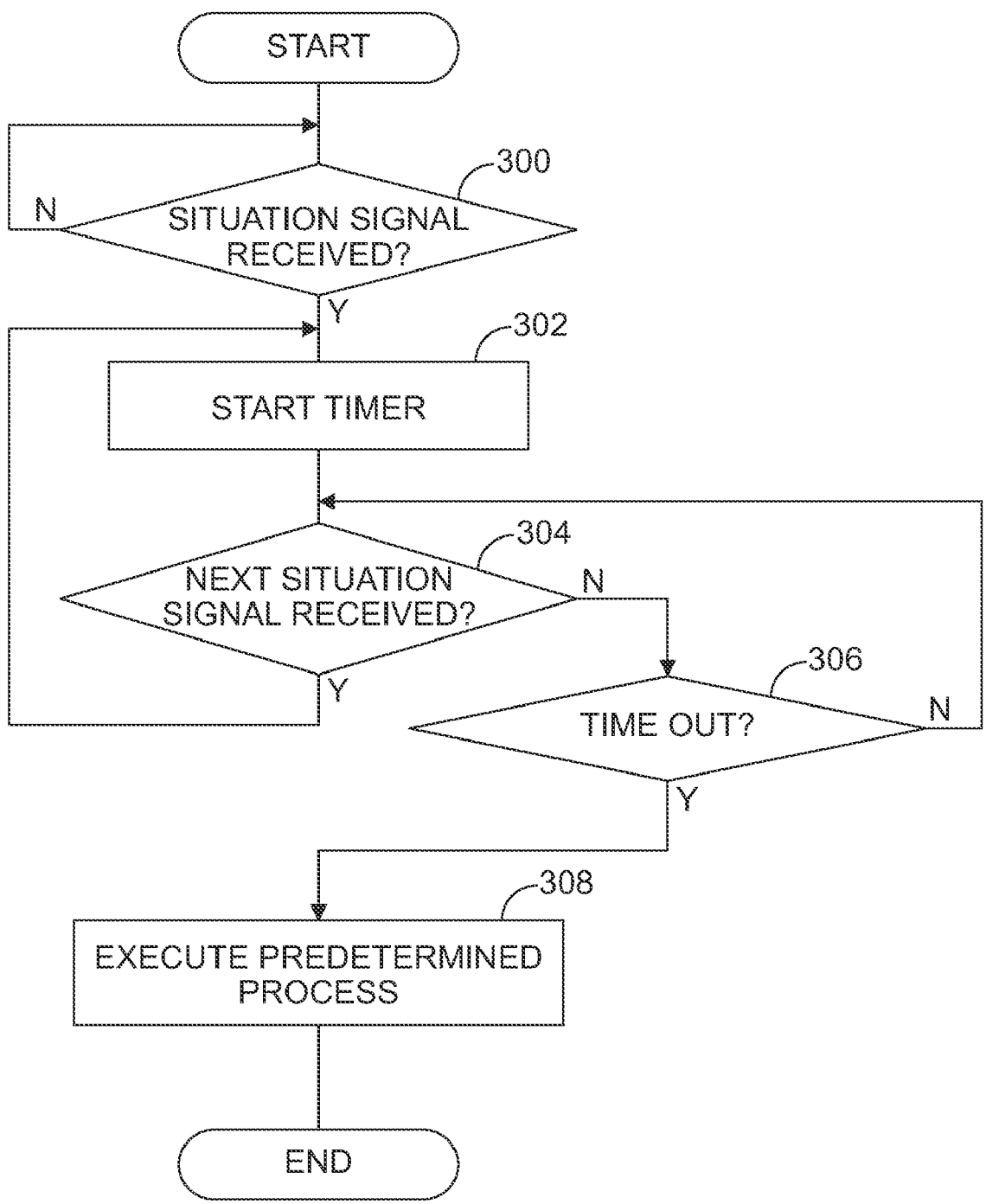
FIG. 11 is a flowchart illustrating a process routine of when a function of the timer IC according to the fifth exemplary embodiment is executed by the second CPU.

FIG. 11 is a flowchart illustrating a process routine of when the function of the timer IC 39 according to the fifth exemplary embodiment is executed by the second CPU. A flow of a process of the control of the periods other than the fifth period will be described.

In step 300, it is determined whether the situation signal is received from the CPU 30. When it is determined that the situation signal is received, the process proceeds to step 302, the timeout time according to the corresponding period is set, and the count operation of the timer that is provided in the second CPU starts.

In step 304, it is determined whether a next situation signal is received from the CPU 30. When it is determined that the next situation signal is received, the process returns to step 302, the timeout time corresponding to the next period is set, and the count operation of the internal timer that is provided in the second CPU starts.

Meanwhile, in step 304, when it is determined that the next situation signal is not received, it is determined whether the timer times out, in step 306. When it is determined that the timer does not time out, the process returns to step 304. When it is determined that the timer times out, it is determined that an abnormality is occurred in the corresponding period, the process proceeds to step 308, and the predetermined process according to the period where an abnormality is occurred is executed. Specifically, the signal corresponding to the period where an abnormality is occurred is output.

In the fifth exemplary embodiment, the case where an abnormality occurred in the periods A and B is detected and processed is exemplified. However, an abnormality occurred in the period B may be detected and processed.

In the fifth exemplary embodiment, the period A is divided into 6 periods for an abnormality to be detected, but the invention is not limited thereto. For example, the period A may be divided into three periods that includes a period from process (1) starts to process (4) ends, a period from process (5) starts to process (5) ends, and a period from the second signal is output to the power supply of the CPU 30 is turned off, and an abnormality may be detected. The period B may be set as one period from the period B starts to the period B ends, and an abnormality may be detected.

The timer start signal line 60 is not provided and the situation signal may be used, instead of the timer start signal. For example, when process (5) starts, instead of the timer start signal, the situation signal may be output from the CPU 30 and the timer 86 may be configured to start according to the situation signal. In this case, when the function of the timer IC 39 is executed by the software, the control of the fifth period is performed according to the control routine illustrated in the flowchart of FIG. 11.

The first to fifth exemplary embodiments have been described, but the invention is not limited thereto. For example, instead of the CPUs 30 of the controllers 12, 12A, 12B, and 12C, hardware that may transit to the first state and the second state may be provided. That is, the object where the power is supplied or restricted by the ASIC 34 and the FET 32 may be the hardware other than the CPU 30. For example, the hardware may be an ASIC that is different from the ASIC 34 and a field programmable gate array (FPGA).

The unit that transitions the CPU 30 to the first state and the second state is not limited to the ASIC 34. For example, the unit may be other hardware that has the same function as that of the ASIC 34 illustrated in the first to fifth exemplary embodiments.

Instead of the FET 32 that allows or stops the supply of power to the CPU 30, other switches may be provided.

The preprocessing is not limited to processes (1) to (4) described in the first exemplary embodiment, and the process contents may be changed according to the configuration and the function of the power controller 20 and the controller 12.

The post-processing is not limited to processes (6) to (9) described in the first exemplary embodiment, and the process contents may be changed according to the configuration and the function of the power controller 20 and the controller 12.

The configuration of the image forming apparatus 10 is exemplary, and the image forming apparatus 10 may have the configuration where the image reading unit 14 is not provided.

What is claimed is:

1. A power saving processing apparatus comprising:
a first processor that is configured to transition from a first state where power is supplied and an operation is enabled to a second state where power supply is restricted and the operation is disabled, that executes a pre-process required for such transition before transition from the first state to the second state, and that executes an additional process to output a first signal after executing the pre-process;
an output unit that receives the first signal from the first processor and outputs a second signal after receiving the first signal, and that outputs the second signal when not receiving the first signal output from the first processor within a predetermined time period after a predetermined time after the pre-process starts; and
a transition unit that transitions the first processor to the second state after receiving the second signal output from the output unit.

2. The power saving processing apparatus of claim 1, further comprising:
a detection unit that detects an abnormality that occurs in a period from when the pre-process starts until when the first processor completely transitions to the second state; and
a controller that performs predetermined control according to a time when the abnormality detected by the detection unit occurs.

3. The power saving processing apparatus of claim 2, wherein the controller controls so that the first processor and the transition unit restart when the abnormality is detected during execution of the pre-process.

4. The power saving processing apparatus of claim 2, wherein the controller controls so that the first processor transitions to the second state when the abnormality is detected in a period from when the pre-process ends until when the first processor completely transitions to the second state.

5. The power saving processing apparatus of claim 1, wherein:
the first processor is further configured to transition from the second state to the first state, and executes a necessary post-process after transiting from the second state to the first state;
the transition unit further transitions the first processor from the second state to the first state when the first processor is in the second state and a predetermined event occur; and
the power saving processing apparatus further comprises:
a detection unit that detects an abnormality that occurs in a period from when the pre-process starts until when the first processor completely transitions to the second state and in a period from when the post-process starts until when the post-process ends, and
a controller that performs predetermined control according to a time when the abnormality detected by the detection unit occurs.

6. The power saving processing apparatus of claim 5, wherein the controller controls so that the first processor and the transition unit restart, when the occurrence of the abnormality is detected during execution of the post-process.

7. An image forming apparatus comprising:
an image forming unit that transitions to an image forming operation enabled state where power is supplied and the image forming operation is enabled and an image forming operation disabled state where power supply is restricted and the image forming operation is disabled, and that forms an image based on information of the image, when the image forming unit is in the image forming operation enabled state; and
the power saving processing apparatus of claim 1, wherein
the first processor changes the image forming unit from the image forming operation enabled state to the image forming operation disabled state, executes the pre-process required for transition from the first state to the second state before the transition from the first state to the second state after changing the image forming unit to the image forming operation disabled state, and executes the additional process to output a first signal after executing the pre-process.

8. An image forming apparatus comprising:
an image forming unit that transitions to an image forming operation enabled state where power is supplied and the image forming operation is enabled and an image forming operation disabled state where power supply is restricted and the image forming operation is disabled, and that forms an image based on information of the image, when the image forming unit is in the image forming operation enabled state; and
a power saving processing apparatus comprising:
a first processor that is configured to transition from a first state where power is supplied and an operation is enabled to a second state where power supply is restricted and the operation is disabled, that executes a pre-process required for such transition before transition from the first state to the second state, and that executes an additional process to output a first signal after executing the pre-process;
an output unit that outputs the second signal when a predetermined time period is passed after a predetermined time after the pre-process starts; and
a transition unit that transitions the first processor to the second state after receiving one of the first signal output from the first processor and the second signal output from the output unit,
wherein
the first processor changes the image forming unit from the image forming operation enabled state to the image forming operation disabled state, executes the pre-process required for transition from the first state to the second state before the transition from the first state to the second state after changing the image forming unit to the image forming operation disabled state, and executes the additional process to output a first signal after executing the pre-process.

9. A storage medium readable by a computer, the storage medium storing a program of instructions executable by the computer to perform as an output unit, wherein:
a first processor is configured to transition from a first state where power is supplied and an operation is enabled to a second state where power supply is restricted and the operation is disabled, executes a pre-process required for the transition before transition from the first state to the second state, and executes an additional process to output a first signal after executing the pre-process, a transition unit that comprises an integrated circuit and a transistor, and that transitions the first processor to the second state after receiving a second signal output from the first processor, and the output unit receives the first signal from the first processor and outputs the second signal to the transition unit after receiving the first signal output from the first processor, and outputs the second signal when not receiving the first signal output from the first processor within a predetermined time period after a predetermined time after the pre-process starts.

10. A power saving processing method, wherein:

a first processor is configured to transition from a first state where power is supplied and an operation is enabled to a second state where power supply is restricted and the operation is disabled, executes a pre-process required for the transition before transition from the first state to the second state, and executes an additional process to output a first signal after executing the pre-process, and a transition unit transitions the first processor to the second state after receiving a second signal output from the first processor, the power saving processing method comprising:

receiving the first signal from the first processor and outputting the second signal to the transition unit after receiving the first signal output from the first processor; and outputting the second signal when the first signal output from the first processor is not received for a predetermined time period after a predetermined time after the pre-process starts.

* * * * *